No. 896,565. PATENTED AUG. 18, 1908.
P. MINDER.
GREEN OR HOT HOUSE.
APPLICATION FILED APR. 10, 1907.

WITNESSES:
Frederick Jamison
Anna H. Alter

INVENTOR:
Paul Minder
BY
Fraentzel and Richards,
ATTORNEYS.

UNITED STATES PATENT OFFICE.

PAUL MINDER, OF NEWARK, NEW JERSEY.

GREEN OR HOT HOUSE.

No. 896,565.  Specification of Letters Patent.  Patented Aug. 18, 1908.

Application filed April 10, 1907. Serial No. 367,332.

*To all whom it may concern:*

Be it known that I, PAUL MINDER, a citizen of the United States, residing at Newark, in the county of Essex and State of New Jersey, have invented certain new and useful Improvements in Green or Hot Houses; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in the construction of green-houses or hot-houses; and the present invention relates, more particularly, to a novel eave-plate, gutter and drip-receiver, which may be combined with a metallic sash-bar seat and zinc strip or eave-joint, adapted to receive the panes of glass forming the sloping roof of the green-house, all arranged to provide a perfect and weather-tight joint between said glass and eave-plate.

The present invention has for its principal object to provide a novel and simply constructed eave-plate, gutter and drip-receiver; and, furthermore, to provide a means for arranging or disposing the sash-bar in supporting contact with the eave-plate, whereby a direct contact of the end of the sash-bar with the eaves of the greenhouse is overcome, and the rotting away or decaying of the ends of said sash-bars at their points of contact or support with the eave-plate, which is caused by the collection of condensed moisture, and which slides down said sash-bar to its end, thereby causing said sash-bar end to be constantly soaked with moisture, is entirely prevented and remedied. To this end a metallic sash-bar seat is provided which is practically unaffected by the moisture, and from which the moisture readily passes away without the usual deteriorating effects usually found in the greenhouse constructions of to-day.

Another object of the present invention is to provide a metallic eave-plate which is practically unaffected by moisture from within or without the greenhouse, nor is it affected by any changes of temperature, said metallic eave-plate being of such a construction, that it keeps the moisture away from contact with the said glass frames forming a portion of the vertical walls of the green-house; and, furthermore, being of such construction, that by the single addition of sections or plates of the ordinary L-shaped iron an effective and a perfect outside gutter will be the result.

A further purpose of the construction of said eave-plate hereinafter more fully set forth is, when two or more greenhouses are built side by side or adjoining, to enable two of said eave-plates to be placed edge to edge and thereby form a perfect outside gutter between the adjacent greenhouses, this being possible no matter whether the greenhouses are built at the same time, or one of the greenhouses being added subsequent to the one already built.

A still further object of the present invention is to combine with the said eave-plate an interior drip gutter, whereby the condensed moisture which in all greenhouses finds its way down underneath the interior side of the eaves is caught and then carried off without any deteriorating effects upon the contiguous parts of the building. Thus by this means preventing this moisture from reaching the sash-bar or side-glass frames and thereby causing decay and consequent weakening of the greenhouse-structure.

With these several objects in view, the present invention consists in the novel construction of devices to be fully described in the following specification; and, furthermore, in the several combinations and arrangements of the various parts, which are arranged and constructed with a view to increase the life of greenhouse structures and prevent the decay of the wooden parts through the action of moisture.

The invention consists, furthermore, in the various novel arrangements and combinations of the devices and parts comprising the said structural features, as well as in the details of the construction of the said parts, all of which will be hereinafter more fully set forth, and then finally embodied in the clauses of the claims which are appended to and which form an essential part of this specification.

The said invention is clearly illustrated in the accompanying drawings, in which:—

Similar characters of reference are employed in all of the above described views to indicate corresponding parts.

Referring now to the various figures of the drawings, the reference-character 1 indicates a green-house supporting post, which is preferably provided with an angular member 2 which continues to the peak of the roof, these said supporting posts being adapted to be set at intervals, usually eight feet apart. Secured to the said supporting-posts 1, preferably by means of suitably disposed bolts and nuts 3, is a bracket or arm 4 which is provided with an outwardly extending member 5, upon the upper edge of which is formed the supporting plate or table 6. This supporting plate or table is adapted to receive and support the ends 7 of eave-plates 8 preferably constructed of metal, the said eave-plates being secured to said supporting table by suitably disposed pins or screws 9. Each eave-plate 8 is provided with a slight downward pitch which slants toward the outer edge of the plate to facilitate the carrying off of the water or moisture. The said eave-plate 8 may be further provided upon its outer edge with a downwardly extending projection or rib 10, which serves as a stop or guard to prevent the water or moisture from working around and upon the under side of the said eave-plate 8 and ultimately reaching the wood-work of the vertical side-walls or sashes, but causing the collected moisture or water to drip clear of said vertical side walls or sashes as will be clearly evident.

Figure 1:
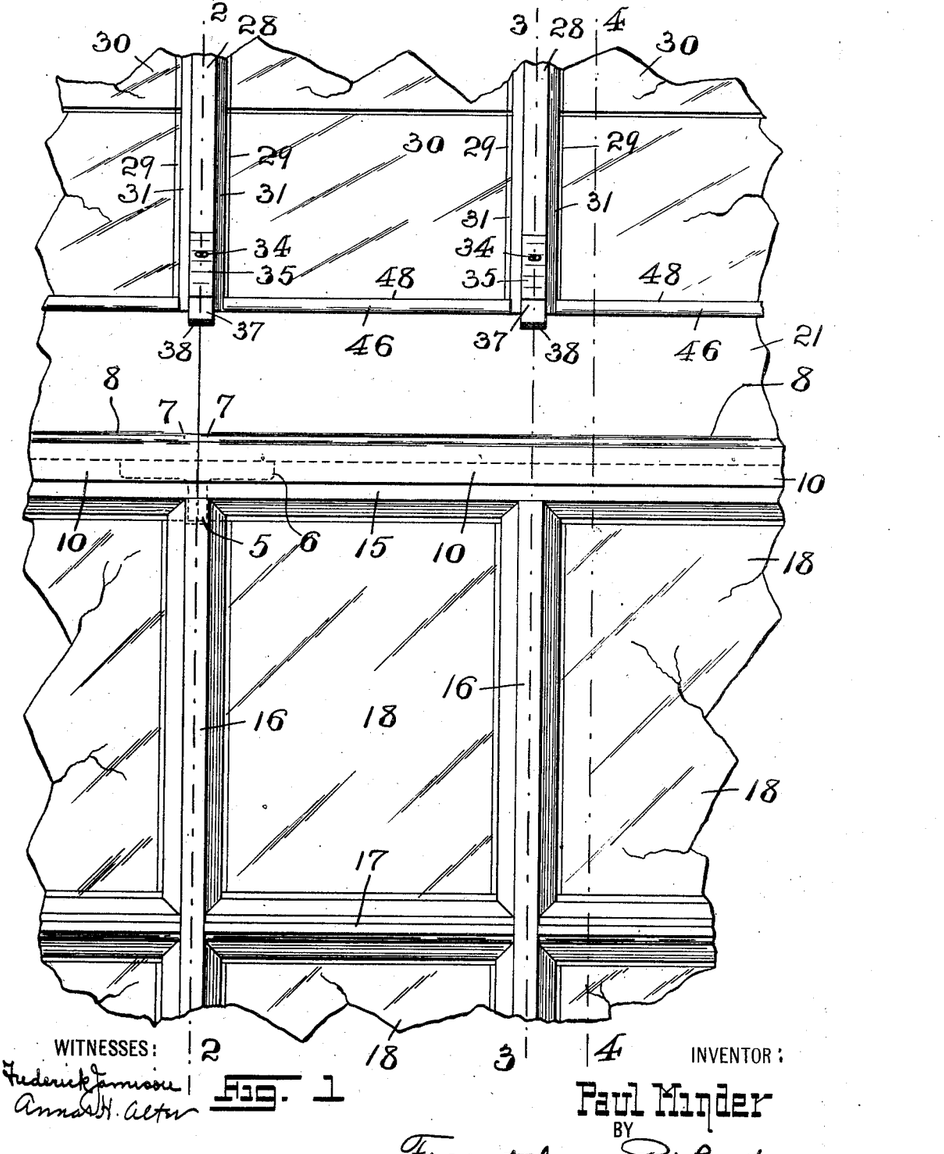
Figure 1 is a side elevation of a portion of a green-house illustrating a portion of the sloping roof and a portion of the vertical side walls, where the same join the eave-plate and other structural features, all embodying the principles of the present invention.
Figure 2:
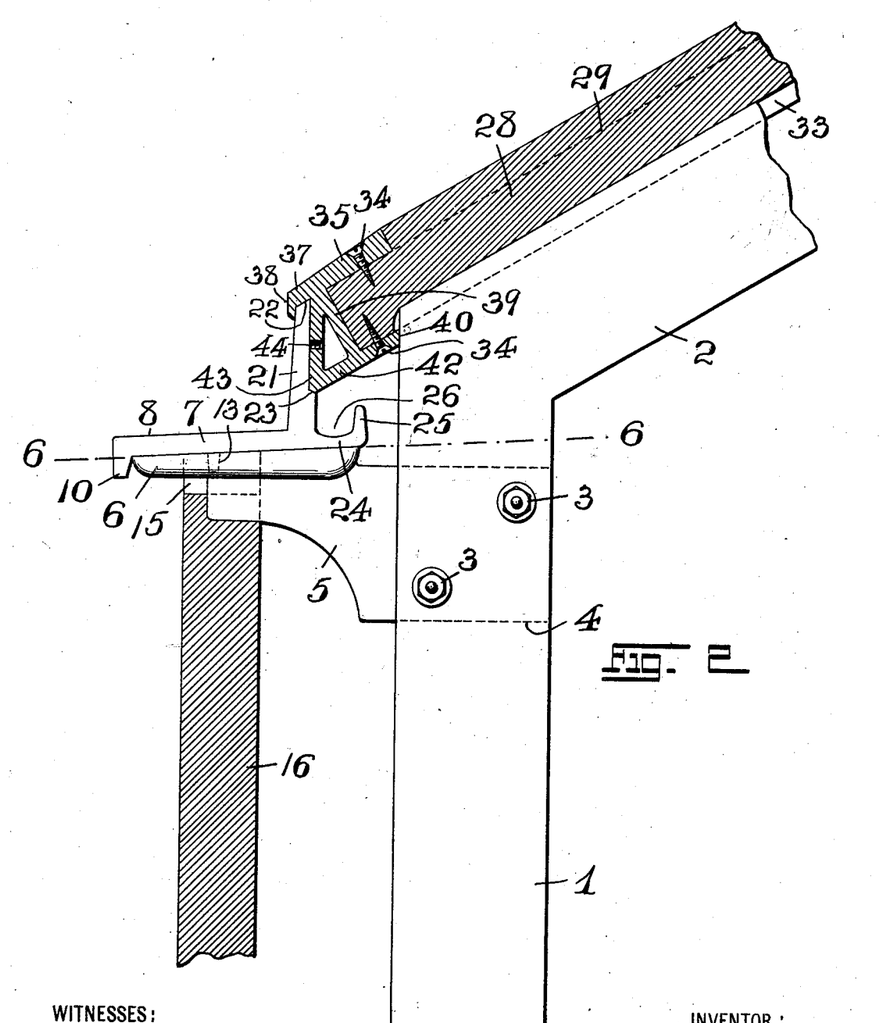
Fig. 2 is a vertical cross-section of the same, taken on line 2—2 in said Fig. 1.
Figures 3, 4:
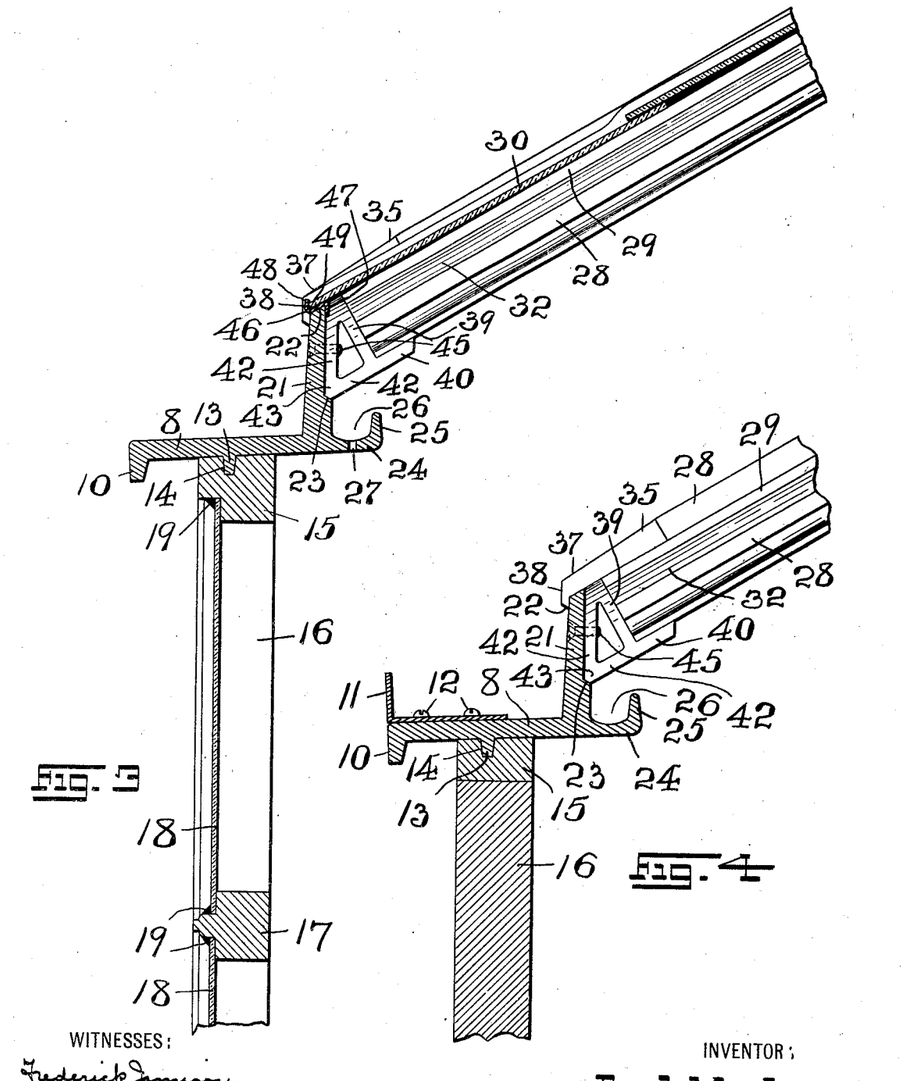
Fig. 3 is another vertical cross-section of the same, taken on line 3—3 in said Fig. 1.
Fig. 4 is a vertical cross-section, similar to that shown in Fig. 3, but taken on line 4—4, and illustrating the sash-bar and sash-bar-seat in elevation, with the glass removed.
Figure 5:
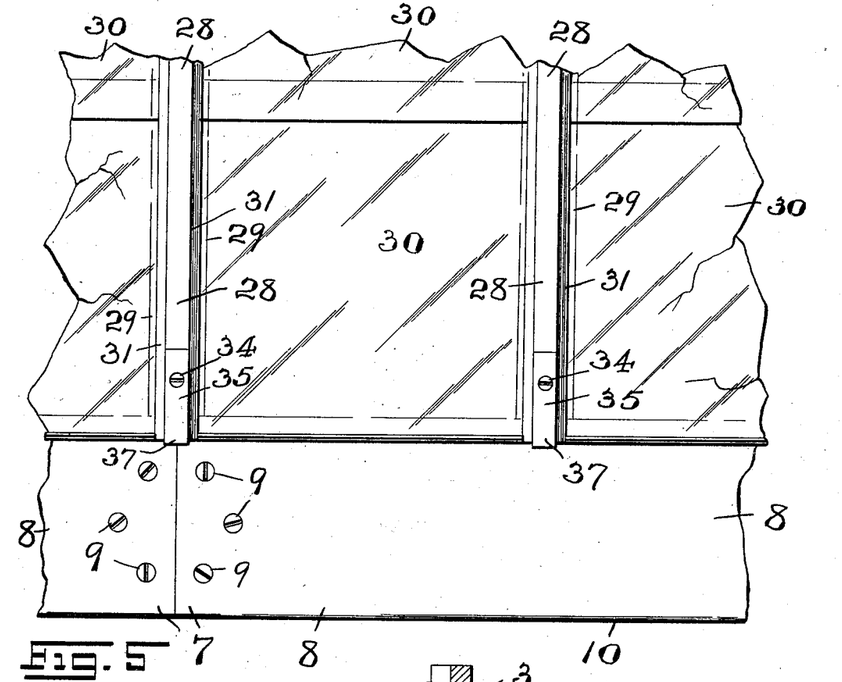
Fig. 5 is a plan or top view of a portion of a green-house.
Figure 6:
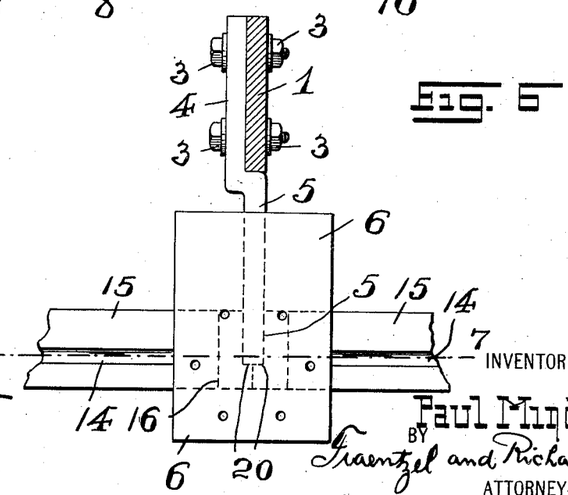
Fig. 6 is a detail section, taken on line 6—6 in said Fig. 2, with the eave-plate removed and looking in a downward direction.
Figure 7:
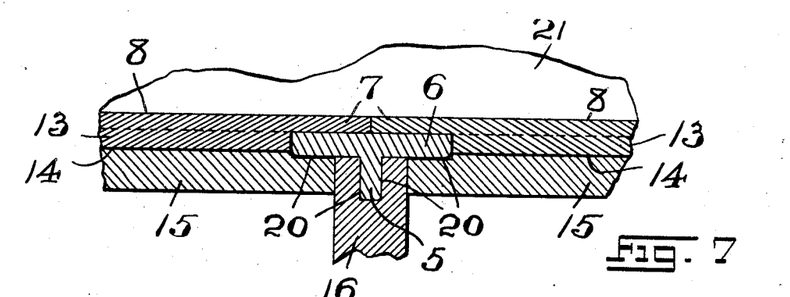
Fig. 7 is a detail longitudinal section, taken on line 7—7 in said Fig. 6, but showing the eave-plate in place.
Figures 8, 9, 10:
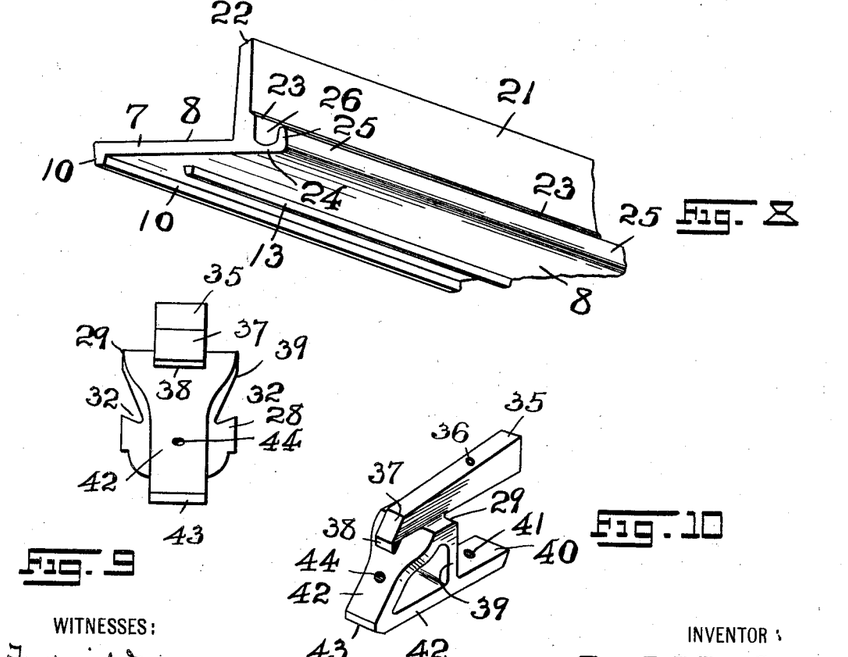
Fig. 8 is a detail perspective view of one end of a section of eave-plate.
Fig. 9 is an end view of a sash-bar, with the sash-bar seat embodying the principles of the present invention, secured upon the edge thereof.
Fig. 10 is a perspective view of the said sash-bar seat removed.

It is sometimes advisable to prevent the water or moisture from dripping off the eave-plate 8, in which case an angle-iron 11 may be secured upon the upper side of said eave-plate 8, by means of screws 12, or otherwise, whereby a very substantial gutter or drain is formed, all of which is more particularly illustrated in Fig. 4 of the drawings. The under side of the said eave-plate 8 is usually formed with a rib or dove-tail 13, which extends the full length of the said eave-plate, with the exception of end-portions of the eave-plate, where it rests upon the supporting table 6. This said rib or dove-tail 13 is adapted to fit into a groove or channel 14 in the upper sill 15 of the sash-frame of the vertical side walls. These said sash-frames are formed by the said upper sill 15, the vertical frame-members 16, and the cross-frame members 17, and are provided with window panes or lights 18 which are held in place in the usual manner, and are made weather tight with the application of putty 19. The said upper sills 15 and the vertical frame-members 16 are provided with suitably cutaway portions 20, where the same are fitted around the outwardly extending member 5 of the bracket or arm 4 and its supporting plate or table 6. By virtue of the rib or dove-tail 13 of the eave-plate 8, and the groove or channel 14 in the upper-sill 15, a practically moisture and weather proof joint is established between the eave-plate 8 and the vertical side-walls of the green-house. The said eave-plate 8 may be further provided with an upwardly extending member 21, having its upper edge usually provided with a chamfer, as 22. Near the base of said upwardly extending member 21, and co-extensive with it, is a supporting edge or shoulder 23, and beginning at the base of this upwardly extending member 21 and the shoulder 23 is an inwardly extending member 24 which is provided with a flange or upwardly extending rib 25 upon its outer edge, these said parts being adapted to provide in connection with the upwardly extending member 21 and the supporting edge or shoulder 23, a drip-receiving gutter 26. The latter is usually provided at suitable intervals with holes or openings 27 through which the collected water or moisture caught in said drip-gutter may escape without coming in contact with any portion of the wood-work of the green-house.

The roof of the green-house is formed in the usual manner of glass, secured in suitable wooden sash-bars 28, provided with the usual supporting shoulders 29 for the reception of the window panes or lights 30 which are secured thereto in the usual manner, and are made weather-tight by means of putty 31. The said sash-bars are furthermore provided with the usual side channels or grooves 32, adapted to convey the moisture, caused by condensation, down to the eaves. Each of the sash-bars 28, which lie directly over the rafter-like support 2 of the supporting-post 1 are provided upon the under side with a channel or groove 33 adapted to receive the upper edge of said rafter-like support 2, thereby producing greater rigidity and lateral strength. Such of the sash-bars 28 as lie between said rafter-like supports 2 need not, of course, be provided with said channel or groove 33. Secured upon the ends of the sash-bars 28, by means of screws 34, or in any other suitable manner, is a sash-bar seat, preferably constructed of metal. This said sash-bar seat is formed by an upper tongue-member 35, which is provided with a screw-hole 36, through which a screw may be inserted to secure the same to said sash-bar, said upper tongue-member 35 having a forwardly extending member 37. The latter is provided with a small downwardly extending lug 38, the same being adapted to engage with the upper chamfered edge 22 of the upwardly extending member 21 of the eave-plate 8. The said upper tongue member 35 is preferably integrally connected, by means of a tie-piece 39, with a lower tongue-member 40, also provided with a screw-hole 41 through which a screw may be inserted to secure the same to the end of the sash-bar 28. These above described parts, as will be clearly evident, form a receiving socket for the end of said sash-bar 28. Integrally connected with the upper tongue-member 35, the tie-piece 39, and the lower tongue-member 40, is an angle-iron or piece 42, said angle-iron or piece 42 being arranged in such a manner that when brought up against the inner side of the upwardly extending member 21 of the eave-plate 8, it will allow the sash-bar 28 to conform with the proper pitch or slant of the roof. This said angle-iron or piece 42 is adapted, furthermore, to rest with its free end 43 upon the projection or shoulder 23 of the upwardly extending member 21 of the eave-plate 8, so that a strong and substantial support is given to the end of the said sash-bar 28. A screw-hole 44 may be provided, whereby a screw 45 may be inserted through the upwardly extending member 21 of the eave-plate 8, except at the ends of said eave-plate, for the further strengthening of the sash-bar seat, as will be clearly understood.

It will be readily seen from an inspection of the drawings, that any water caused by condensation, or otherwise, which collects upon the sash-bar 28, will roll or slide down and off of said sash-bar, onto the metallic sash-bar seat, and thence drip into the drip-gutter beneath. Hence, no moisture can collect upon the ends of the sash-bars, as is usual in the constructions now in general use, in which the parts are practically water-soaked all the time, which of course hastens decay and weakens the green-house structure.

To provide a weather-tight connection between the glass of the roof and the upwardly extending member 21 of the eave-plate 8, there may be provided an S-shaped or other suitably shaped zinc-strip or plate 46, which may be fitted over the chamfered edge 22 of the upwardly extending member 21 by means of the downwardly extending rib 47, and an upwardly extending rib 48 which engages with the edge 49 of the glass, thus holding the same and creating a tight joint between the eave-plate and said glass.

Figure 11:
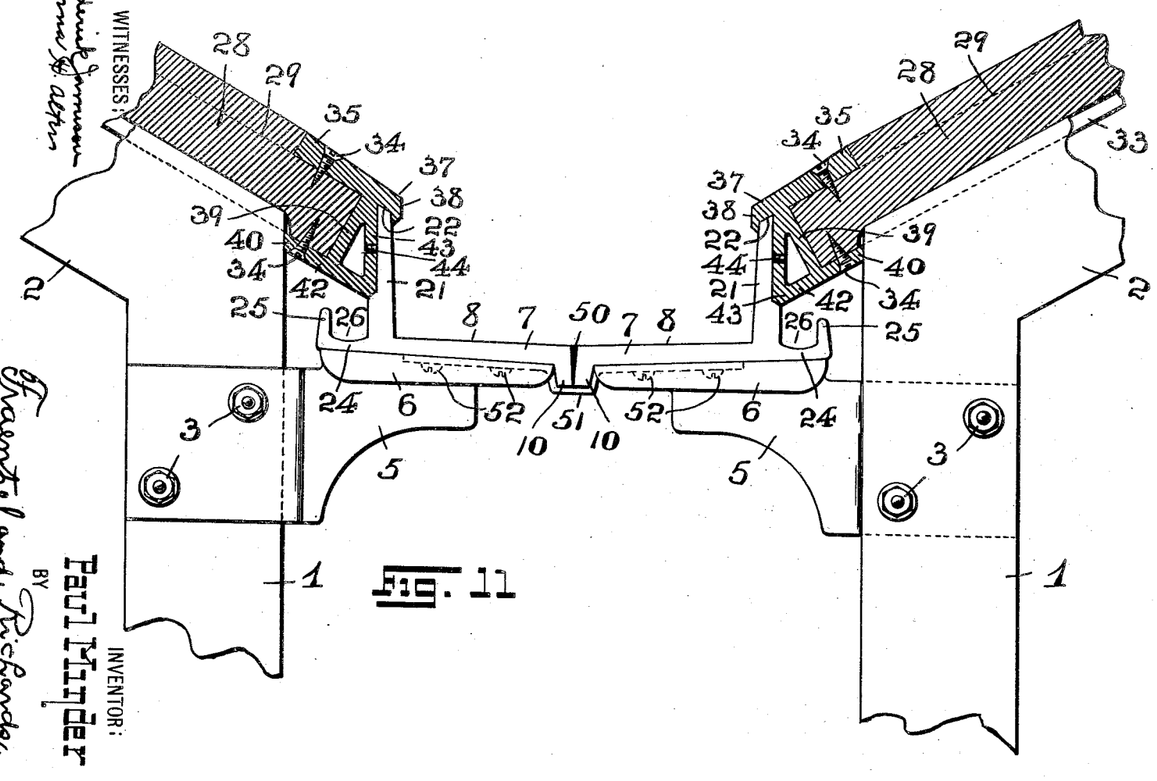
Fig. 11 is a vertical cross-section, illustrating the method of building two green houses side by side, so that the eave-plates will form an intermediate outside gutter.

Referring now to Fig. 11 of the drawings, there is illustrated therein a method of building two or more green-houses side by side. The eave-plates 8 are alined or placed edge to edge against each other at their outer edges, and a cement 50 or other like material is filled in the joints, thereby providing a gutter between the sloping roofs of green-houses. A tie-strip 51 may be secured upon the under sides of the eave-plates 8, by means of screws 52, the strips being distributed at suitable intervals, to more firmly bind the said eave-plates together.

Figures 12, 13:
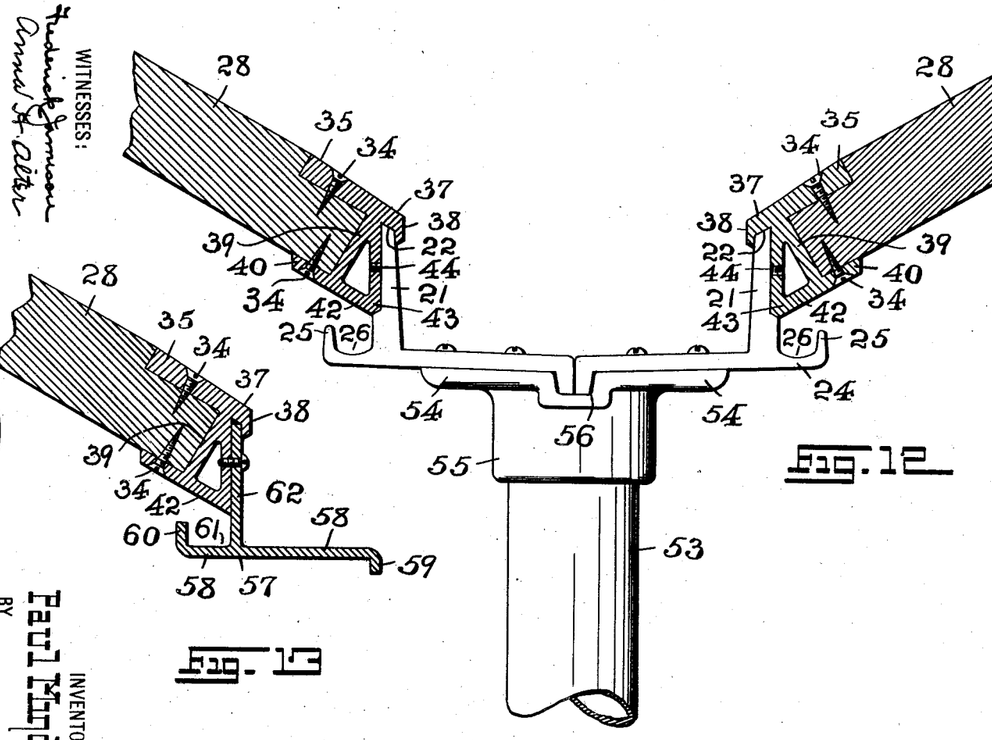
Fig. 12 is a similar view, but illustrating a modified means of supporting the eave-plates, viz. by means of a center-post construction.
Fig. 13 is a detail vertical cross-section, illustrating a slightly modified form of eave-plate embodying the principles of the present invention.

In Fig. 12 is shown a slightly modified means of supporting the eave-plates 8, when two or more green-houses are built side by side. This construction is called a center-post construction, and consists, essentially, of a center-supporting post or column 53 upon the upper face or end of which is arranged an eave-plate supporting table or element 54, which is provided with a socket 55 into which the center supporting post or column 53 is secured, in any desirable manner. The supporting table or element 54 is provided with a centrally disposed channel or groove 56 adapted to receive the downwardly extending ribs 10 of the eave-plates 8, a cement 50, or other similar material being also preferably used in this construction, to fill the seam or joint between the edges of the contacting eave-plates 8 and in the channel or groove 56, to provide a moisture proof gutter between the sloping roofs of the adjoining green-houses.

In Fig. 13 there is illustrated a slightly modified form of eave-plate 57 which is made of T-iron, the outer edge of the horizontal member 58 being turned down to form a rib 59, which prevents the moisture or water from working around the under side thereof; and, the opposite edge of the horizontal member 58 being turned up to form a rib 60, and thereby providing an interior drip-gutter 61. The vertical member 62 rising from the horizontal member 58 is adapted to provide means for the engagement therewith of the previously mentioned sash-bar seat, described in the foregoing specification.

From the drawings and the above description, it will be readily understood, that the present invention provides a simple and efficient construction of eaves for green-houses, and a sash-bar connection, which are effective in providing a construction and arrangement of devices and parts impervious to moisture and water, and thereby does away with all deteriorating effects, at the same time affording a very strong, substantial and durable green-house construction.

I claim:

1. The herein described eave-plate comprising a supporting plate-like member, a downwardly extending rib formed along one of the longitudinal edges of said member, an upwardly extending flange formed along the other longitudinal edge of said member, and an intermediately arranged and upwardly extending supporting member on said plate-like member, said supporting member having its upper edge made with a chamfer, and provided also with a supporting shoulder 23, substantially as and for the purposes set forth.

2. The herein described eave-plate comprising a supporting plate-like member, a downwardly extending rib formed along one of the longitudinal edges of said member, an upwardly extending flange formed along the other longitudinal edge of said member, and an intermediately arranged and upwardly extending supporting member on said plate-like member, combined with a post and an angular rafter-like member on said post, and a supporting bracket between said post and said supporting plate-like member, substantially as and for the purposes set forth.

3. The herein described eave-plate comprising a supporting plate-like member, a downwardly extending rib formed along one of the longitudinal edges of said member, an upwardly extending flange formed along the other longitudinal edge of said member, and an intermediately arranged and upwardly extending supporting member on said plate-like member, said supporting member having its upper edge made with a chamfer, and provided also with a supporting shoulder 23, combined with a post and an angular rafter-like member on said post, and a supporting bracket between said post and said supporting plate-like member, substantially as and for the purposes set forth.

4. In a green-house, the combination, with a post provided with an upper angular member, of a sash-bar arranged upon the angular member of said post, a bracket extending outwardly from said post, an eave-plate upon said bracket, an upwardly extending flange and an upwardly extending supporting member upon said eave-plate, said flange and supporting member providing a drip-receiving gutter between them, a sash-bar seat provided with portions which embrace the end of the sash-bar, and means on said sash-bar seat for the engagement of the latter with the supporting member of the eave-plate, substantially as and for the purposes set forth.

5. In a green-house, the combination, with a post provided with an upper angular member, of a sash-bar arranged upon the angular member of said post, a bracket extending outwardly from said post, an eave-plate upon said bracket, an upwardly extending flange and an upwardly extending supporting member upon said eave-plate, said flange and supporting member providing a drip-receiving gutter between them, a sash-bar seat provided with portions which embrace the end of the sash-bar, and means for securing said portions to said sash-bar, a forwardly extending member 37 and a downwardly extending lug 38 with which said sash-bar seat is provided, said forwardly extending member and said lug providing a retaining means adapted to embrace the upper portion of the supporting member of the eave-plate for securing said sash-bar seat to said supporting member, substantially as and for the purposes set forth.

6. In a green-house, the combination, with a post provided with an upper angular member, of a sash-bar arranged upon the angular member of said post, a bracket extending outwardly from said post, an eave-plate upon said bracket, an upwardly extending flange and an upwardly extending supporting member upon said eave-plate, said flange and supporting member providing a drip-receiving gutter between them, said supporting member being provided with a supporting shoulder, a sash-bar seat provided with portions which embrace the end of the sash-bar, and means for securing said portions to said sash-bar, means on said sash-bar seat for the engagement of the latter with the upper edge of the supporting member of the eave-plate, and the lower edge-portion of said sash-bar seat resting upon the shoulder of said supporting member, substantially as and for the purposes set forth.

7. In a green-house, the combination, with a post provided with an upper angular member, of a sash-bar arranged upon the angular member of said post, a bracket extending outwardly from said post, an eave-plate upon said bracket, an upwardly extending flange and an upwardly extending supporting member upon said eave-plate, said flange and supporting member providing a drip-receiving gutter between them, said supporting member being provided with a supporting shoulder, a sash-bar seat provided with portions which embrace the end of the sash-bar, and means for securing said portions to said sash-bar, a forwardly extending member 37 and a downwardly extending lug 38 with which said sash-bar seat is provided, said forwardly extending member and said lug providing a retaining means
5 adapted to embrace the upper portion of the supporting member of the eave-plate for securing said sash-bar seat to said supporting member, and said sash-bar seat being provided with an end-portion 43 resting upon
10 the shoulder of said supporting member, substantially as and for the purposes set forth.

In testimony, that I claim the invention set forth above I have hereunto set my hand this 6th day of April, 1907.

PAUL MINDER.

Witnesses:
    FREDK. C. FRAENTZEL,
    HENRY LACEY.